United States Patent
Kim

(10) Patent No.: US 10,584,644 B2
(45) Date of Patent: Mar. 10, 2020

(54) FUEL INJECTION SYSTEM AND METHOD OF CONTROLLING THE SAME

(71) Applicant: HANWHA AEROSPACE CO.,LTD., Changwon-si (KR)

(72) Inventor: Myeonghyo Kim, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 421 days.

(21) Appl. No.: 14/805,815

(22) Filed: Jul. 22, 2015

(65) Prior Publication Data
US 2016/0273458 A1 Sep. 22, 2016

(30) Foreign Application Priority Data
Mar. 18, 2015 (KR) .................. 10-2015-0037703

(51) Int. Cl.
*F02C 9/28* (2006.01)
*F02C 7/22* (2006.01)
*F02C 7/232* (2006.01)

(52) U.S. Cl.
CPC ............. *F02C 9/28* (2013.01); *F02C 7/222* (2013.01); *F02C 7/232* (2013.01); *F05D 2220/50* (2013.01); *F05D 2260/85* (2013.01); *F05D 2270/092* (2013.01); *F05D 2270/31* (2013.01)

(58) Field of Classification Search
CPC .... F02C 9/26; F02C 9/32; F02C 9/263; F02C 9/28; F02C 7/22; F02C 7/222; F02C 7/228; F02C 7/232; F02C 7/26; F23R 3/28; F23R 3/343; F05D 2220/50; F05D 2260/85; F05D 2270/092; F05D 2270/31

USPC ......................................................... 60/772
See application file for complete search history.

(56) References Cited

U.S. PATENT DOCUMENTS

| 2,528,252 | A | * | 10/1950 | Starkey | G05D 23/185 236/82 |
| 3,931,808 | A | | 1/1976 | Rachel | |
| 4,106,730 | A | * | 8/1978 | Spitzer | G05D 1/0072 244/182 |
| 4,391,290 | A | * | 7/1983 | Williams | F01D 11/24 137/340 |
| 4,543,785 | A | | 10/1985 | Patrick | |
| 2011/0016873 | A1 | * | 1/2011 | Nakamura | F02C 9/34 60/772 |

(Continued)

FOREIGN PATENT DOCUMENTS

JP 2008-274874 A 11/2008
KR 10-2012-0028114 A 3/2012

*Primary Examiner* — Mark A Laurenzi
*Assistant Examiner* — Loren C Edwards
(74) *Attorney, Agent, or Firm* — Sughrue Mion, PLLC

(57) ABSTRACT

A fuel injection system of a gas turbine includes a first pilot nozzle injecting fuel in a first flow rate range, a second pilot nozzle injecting fuel in a second flow rate range that is greater than the first flow rate range, a main nozzle injecting fuel in a third flow rate range that is greater than the second flow rate range, a first valve opening or closing a first supply pipe fueling the second pilot nozzle, a second valve opening or closing a second supply pipe fueling the main nozzle, and a controller selectively opening any one of the first supply pipe and the second supply pipe or opening or closing both of the first supply pipe and the second supply pipe by reflecting a change in altitude and thus applying control signals to the first valve and the second valve.

12 Claims, 9 Drawing Sheets

(56) References Cited

U.S. PATENT DOCUMENTS

2011/0302927 A1* 12/2011 Ajami ................ F02C 7/26
60/776
2012/0060793 A1 3/2012 Kim

* cited by examiner

FUEL INJECTION SYSTEM AND METHOD OF CONTROLLING THE SAME

CROSS-REFERENCE TO RELATED APPLICATION

This application claims priority from Korean Patent Application No. 10-2015-0037703, filed on Mar. 18, 2015, in the Korean Intellectual Property Office, the disclosure of which is incorporated herein by reference in its entirety.

BACKGROUND

1. Field

Apparatuses and method consistent with exemplary embodiments relate to a fuel injection system and a method of controlling the same, and more particularly, to a fuel injection system that may stably fuel an auxiliary power unit (APU) for an aircraft while an altitude of the aircraft changes and a method of controlling the fuel injection system.

2. Description of the Related Art

Auxiliary power units (APUs) for aircrafts supply power to generators, hydraulic pumps, or air-conditioning and heating equipment mounted in the aircrafts when the main engines of the aircrafts break down or before the main engines are started (i.e. before the aircrafts take off).

Generally, an APU is a small gas turbine engine or the like. Although the APU supplies emergency power necessary for starting the main engines or for a safe flight, the APU has an operational limit according to a change in a flying altitude of an aircraft.

For example, civil aircrafts may fly at an altitude of approximately 11 km (36,000 feet) above the ground. At this altitude, air pressure decreases about 23% compared to the air pressure on the ground, and therefore, a maximum fuel flow rate needed to operate an APU also decreases up to about 20% as compared to the flow rate need on the ground. A minimum fuel flow rate needed to operate the APU when starting and running the APU with minimum power is designed to be about 5% of the maximum fuel flow rate on the ground. However, in order for the APU to stably operate even at 13 km (41,000 feet), which is the highest flying altitude of a civil aircraft, the APU has to be able to work with a flow rate even less than the minimum fuel flow rate, which is about 3 to 4% of the maximum fuel flow rate on the ground.

The highest flying altitude of military aircrafts reaches 18 km (55,000 feet). At this altitude, air is rarefied and thus most APUs are impossible to start and operate.

Such a limit to starting and operating an APU as described above exists because a range of fuel flow rate needed to operate the APU also varies greatly as an altitude of an aircraft changes from the ground to the highest flying altitude of the aircraft. Generally, a fuel nozzle that fuels an APU combustor is composed of a main nozzle and a pilot nozzle having different flow rates from each other. Due to the fuel nozzle having two nozzles, it is difficult to fuel the APU combustor while maintaining excellent fuel injection characteristics in all the fuel flow rate ranges which correspond to the aircraft's changes in the flying altitude.

U.S. Pat. No. 4,543,785, filed on Oct. 1, 1985, introduces a technology of dividing a combustion chamber into a main burner and a secondary burner and injecting fuel into a low-temperature portion by using a lower nozzle in order to operate an aircraft engine at a high altitude. Although the intention of this technology is to improve the total efficiency of the engine, the problem of a change in the fuel flow rate of an APU according to a change in an altitude of an aircraft is not addressed by the technology.

Korean Patent Application Publication No. 2012-0028113, filed on Mar. 22, 2012, discloses an apparatus and method of controlling the number of pilot injections. The technology enables injecting fuel into an engine by varying the number of pilot injections according to an operation condition of the engine, thereby responding to an acceleration condition of the engine. However, the problem of a change in fuel flow rate of an APU according to a change in an altitude of an aircraft is not addressed by the technology.

U.S. Pat. No. 3,931,808, filed on Jan. 13, 1976, discusses a technology of adjusting the amount of fuel supplied to an engine as a system for compensating for a change in an altitude of an aircraft. Such a technology employs a method of adjusting an injection cycle of an injector by sensing a change in ambient atmospheric pressure according to an altitude change and altering a pulse width of a control signal supplied to the injector. However, as a flow rate range injected by one injector is limited, it is difficult to solve a fuel flow shortage problem of an APU that occurs at high altitude through the method of adjusting an injection cycle of an injector.

Japanese Patent Application Publication No. 2008-274874, filed on Nov. 13, 2008, discusses a technology of compensating for a change of altitude based on a drop in density of intake air. However, as such a technology is for reducing the amount of fuel injection, it is difficult to solve the fuel flow shortage problem of an APU that occurs at high altitude.

SUMMARY

Aspects of one or more exemplary embodiments provide a fuel injection system that may stably fuel an auxiliary power unit (APU) of an aircraft in response to an altitude change of the aircraft and a method of controlling the fuel injection system.

Aspects of one or more exemplary embodiments provide a fuel injection system that may adjust an injection amount of fuel supplied to an APU of an aircraft in response to a change in atmospheric pressure according to an altitude change of the aircraft and a method of controlling the fuel injection system.

Additional aspects will be set forth in part in the description which follows and, in part, will be apparent from the description, or may be learned by practice of the presented embodiments.

According to an aspect of another exemplary embodiment, there is provided a fuel injection system, which is a fuel injection system of a gas turbine, which includes a first pilot nozzle injecting fuel in a first flow rate range into the gas turbine, a second pilot nozzle injecting fuel in a second flow rate range that is greater than the first flow rate range into the gas turbine, a main nozzle injecting fuel in a third flow rate range that is greater than the second flow rate range into the gas turbine, a first valve disposed on a first supply pipe supplying fuel to the second pilot nozzle and opening or closing the first supply pipe in response to a signal applied from the outside, a second valve disposed on a second supply pipe supplying fuel to the main nozzle and opening or closing the second supply pipe in response to a signal applied from the outside, and a controller selectively opening any one of the first supply pipe and the second supply pipe or opening or closing both of the first supply pipe and the second supply pipe by reflecting a change in altitude and thus applying the signals to the first valve and the second valve, thereby controlling a flow of fuel to be injected into the gas turbine.

The gas turbine may include a combustion chamber fueled by the first pilot nozzle, the second pilot nozzle, and the main nozzle and a compressor which supplies compressed air to the combustion chamber. The system may further include a pressure sensor sensing discharge pressure of the compressor, and the controller may be connected to the pressure sensor, and thus, may reflect the change in altitude based on a change in the discharge pressure of the compressor.

The controller may close both of the first valve and the second valve when the discharge pressure of the compressor is less than a predetermined first pressure, may open the first valve and close the second valve when the discharge pressure of the compressor is equal to or greater than the first pressure and less than a predetermined second pressure, and may open both of the first valve and the second valve when the discharge pressure of the compressor is equal to or greater than the second pressure.

The system may further include an altitude sensor which senses altitude by sensing air pressure, using ultrasonic waves, using radar, or using a global position system (GPS), wherein the controller may be connected to the altitude sensor, and thus, the controller may sense the change in altitude.

The controller may retain information on a current altitude corresponding to a sensed value of the altitude sensor, and may close both of the first valve and the second valve when the current altitude is in a predetermined first range, may open the first valve and close the second valve when the current altitude is greater than the first range and less than a predetermined second range and may open both of the first valve and the second valve when the current altitude is in or greater than the second range.

Flows of fuel injected by the first pilot nozzle, the second pilot nozzle, and the main nozzle may be determined by circumferential areas of an injection portion of the first pilot nozzle, the second pilot nozzle, and the main nozzle.

According to an aspect of another exemplary embodiment, a fuel injection system for a gas turbine includes a nozzle assembly including a plurality of pilot nozzles injecting fuel at different ranges of flow rate into the gas turbine and a main nozzle injecting fuel in a flow rate range that is larger than those of the pilot nozzles into the gas turbine, a plurality of valves respectively disposed on supply pipes connected to the main nozzle and the pilot nozzles except a first pilot nozzle injecting fuel in the smallest flow rate range among the pilot nozzles into the gas turbine, and respectively opening or closing the supply pipes in response to signals applied from the outside, and a controller selectively opening at least one selected from the supply pipes or closing all of the supply pipes by reflecting a change in altitude and applying the signals to the valves, thereby controlling a flow of fuel to be injected into the gas turbine.

The controller may close all of the valves when discharge pressure of a compressor supplying compressed air to a combustion chamber of the gas turbine is less than a predetermined first pressure, and may select and open at least some of the valves depending on a size of the discharge pressure of the compressor when the discharge pressure of the compressor is equal to or greater than the first pressure.

According to an aspect of another exemplary embodiment, a method of controlling a fuel injection system for a gas turbine includes sensing a change in altitude, and injecting fuel into the gas turbine by reflecting a sensed change in altitude, and thus, selecting at least one selected from a first pilot nozzle injecting fuel in a first flow rate range into the gas turbine, a second pilot nozzle injecting fuel in a second flow rate range that is larger than the first range into the gas turbine, and a main nozzle injecting fuel in a third flow rate range that is larger than the second range into the gas turbine.

A first valve opening or closing a first supply pipe in response to a signal applied from the outside may be disposed on the first supply pipe fueling the second pilot nozzle and a second valve opening or closing a second supply pipe in response to a signal applied from the outside may be disposed on the second supply pipe fueling the main nozzle, and the sensing of the change in altitude may include sensing a change in altitude by sensing discharge pressure of a compressor supplying compressed air to the gas turbine, and the injecting of the fuel may include closing both of the first valve and the second valve when the discharge pressure of the compressor is less than a predetermined first pressure, opening the first valve and closing the second valve when the discharge pressure of the compressor is equal to or greater than the first pressure and less than a predetermined second pressure, and opening both of the first valve and the second valve when the discharge pressure of the compressor is equal to or greater than the second pressure.

According to an aspect of another exemplary embodiment, a nozzle assembly may be provided which has a plurality of pilot nozzles which are configured to inject fuel at different flow rate ranges. The plurality of pilot nozzles include, a first pilot nozzle of the plurality of pilot nozzles configured to inject fuel at a first fuel flow rate, a second pilot nozzle of the plurality of nozzles configured to inject fuel at a second fuel flow rate. The first fuel flow rate is smaller than the second fuel flow rate, and the second pilot nozzle is configured to either inject fuel or not inject fuel depending on a sensed change in altitude of nozzle assembly.

The nozzle assembly may further include a main pilot nozzle of the plurality of pilot nozzles configured to inject fuel at a third fuel flow rate. The third fuel flow rate is larger than the second fuel flow rate.

Further, the nozzle assembly may include a sensor connected to the plurality of nozzles for detecting the sensed change in altitude of the nozzle assembly.

A fuel injection system including the nozzle assembly may further include a controller configured to receive a signal from the sensor of the sensed change in altitude, and send a signal to the plurality of nozzle. The controller selectively controls the fuel flow of at least one nozzle of the plurality of nozzles corresponding to the sensed change in altitude.

BRIEF DESCRIPTION OF THE DRAWINGS

The above and/or other aspects of the disclosure will become apparent and more readily appreciated from the following description of the embodiments, taken in conjunction with the accompanying drawings in which.

DETAILED DESCRIPTION

Figure 1:
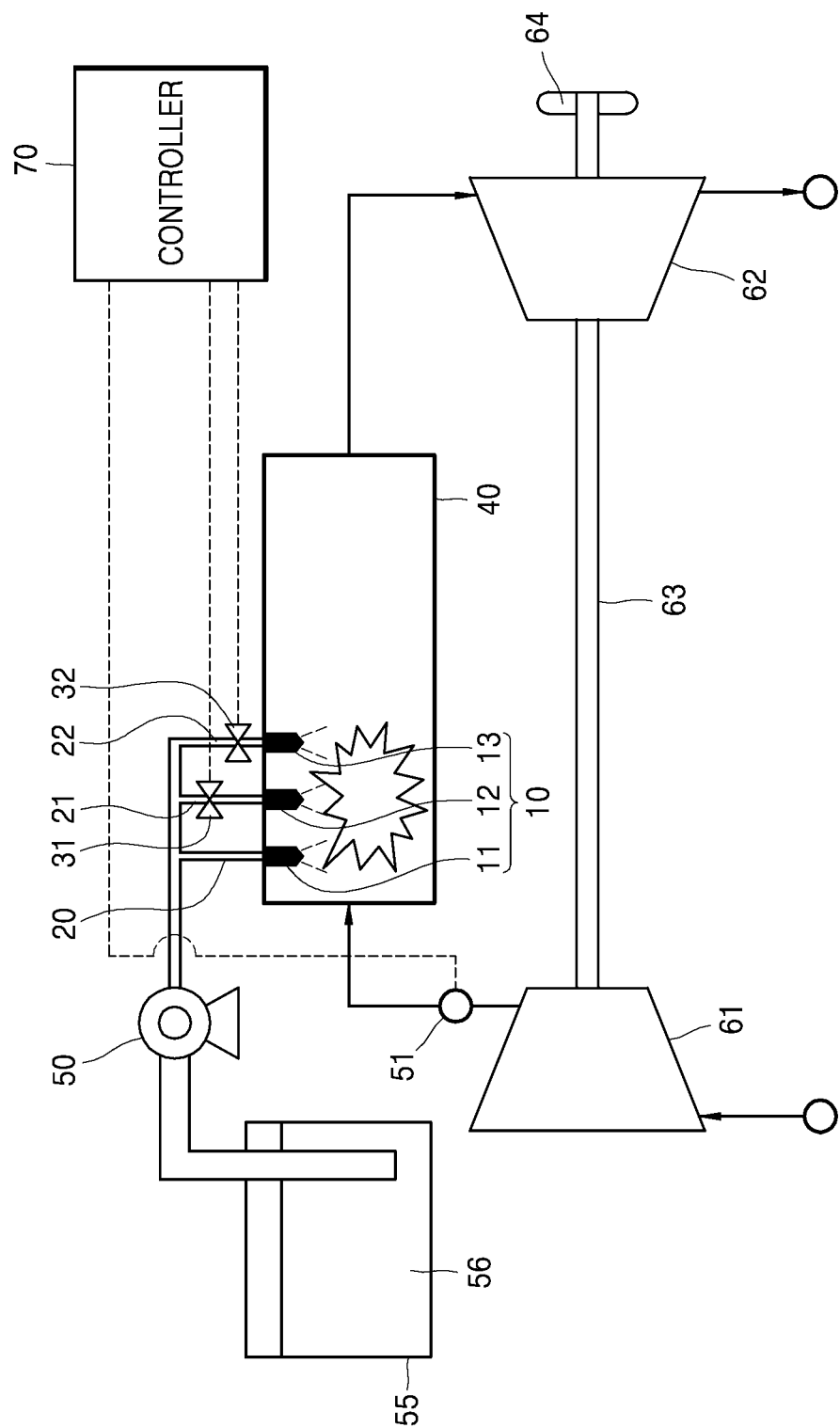
FIG. 1 is a schematic diagram illustrating connections between elements of a fuel injection system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description.

Hereinafter, configuration and operation of a fuel injection system according to exemplary embodiments will be described in detail with reference to the accompanying drawings. As used herein, the term "and/or" includes any and all combinations of one or more of the associated listed items. Expressions such as "at least one of," when preceding a list of elements, modify the entire list of elements and do not modify the individual elements of the list.

FIG. 1 is a schematic diagram illustrating connections between elements of a fuel injection system according to an exemplary embodiment.

The fuel injection system of FIG. 1 is a system for injecting fuel into a gas turbine used as an auxiliary power unit (APU) of an aircraft. The fuel injection system includes a combustion chamber 40 where fuel is injected into, a nozzle assembly 10 for injecting fuel into the combustion chamber 40, a compressor 61 for supplying compressed air to the combustion chamber 40, and a controller 70 for controlling flow of the fuel supplied to the combustion chamber 40 by controlling the nozzle assembly 10 based on an altitude change of the aircraft.

The compressor 61 intakes and compresses air and then supplies compressed air to the combustion chamber 40. A fuel pump 50 intakes and supplies fuel 56 stored in a fuel tank 55 to the nozzle assembly 10.

The nozzle assembly 10 is operated by an injection control signal provided from the controller 70, to thereby inject fuel into the combustion chamber 40 of the gas turbine. The nozzle assembly 10 includes a plurality of pilot nozzles 11 and 12 injecting fuel at different flow rate ranges into the combustion chamber 40, and a main nozzle 13 injecting fuel in at a flow rate range which is greater than the flow rates of the pilot nozzles 11 and 12 into the combustion chamber 40.

In detail, the pilot nozzles 11 and 12 of FIG. 1 include a first pilot nozzle 11 and a second pilot nozzle 12. The first pilot nozzle 11 injects fuel at a first flow rate range into the combustion chamber 40 of the gas turbine. The second pilot nozzle 12 injects, into the combustion chamber 40 of the gas turbine fuel, at a second flow rate range that is greater than the first flow rate range. Accordingly, the first pilot nozzle 11 of the pilot nozzles 11 and 12 injects fuel in the first flow rate that is the smallest flow rate range.

The main nozzle 13 injects fuel into the combustion chamber 40 of the gas turbine at a third flow rate range that is greater than the second flow rate range of the second pilot nozzle 12.

The first pilot nozzle 11, the second pilot nozzle 12, and the main nozzle 13 of the nozzle assembly 10 are each connected to the fuel pump 50 via a respective supply pipe.

A supply pipe 20 connects the first pilot nozzle 11 and the fuel pump 50 to each other, thus, supplying fuel to the first pilot nozzle. A first valve 31 is located on a first supply pipe 21 connecting the second pilot nozzle 12 and the fuel pump 50 to each other, and thus, supplying fuel to the second pilot nozzle 12. As the first valve 31 is operated by a signal applied thereto from the outside, the first valve 31 opens or closes the first supply pipe 21.

A second valve 32 is located on a second supply pipe 22 connecting the main nozzle 13 and the fuel pump 50 to each other, and thus, supplying fuel to the main nozzle 13. As the second valve 32 is operated by a signal applied thereto from the outside, the second valve 32 opens or closes the second supply pipe 22.

The first valve 31 and the second valve 32 may be hydraulically operated valves or pneumatically operated valves, which are valves operated by a hydraulic or pneumatic signal, respectively. Alternatively, the first valve 31 and the second valve 32 may be solenoid valves which are operated by an electromagnetic signal. Accordingly, when a signal is applied from the controller 70 to the first valve 31 or the second valve 32, the first valve 31 or the second valve 32 may allow or block the flow of fuel passing through the first supply pipe 21 or the second supply pipe 22. The first valve 31 or the second valve 32 perform an 'open' operation to open the first supply pipe 21 or the second supply pipe 22 and allow the flow of fuel, or perform a 'close' operation to close the first supply pipe 21 or the second supply pipe 22 to block the flow of fuel.

Hereinafter, 'opening' of the first valve 31 and the second valve 32 refers to open operations by valves for opening the first supply pipe 21 or the second supply pipe 22, and 'closing' of the first valve 31 and the second valve 32 refers to close operations by valves for closing the first supply pipe 21 or the second supply pipe 22.

The controller 70 may reflect a change in altitude, and thus, apply control signals to the first valve 31 and the second valve 32. Thereby, the controller selectively opens or closes any one of the first supply pipe 21 and the second supply pipe 22, or opens or closes both of the first supply pipe 21 and the second supply pipe 22. Thus, the controller 70 may control a flow rate of fuel injected into the combustion chamber 40 of the gas turbine.

Also, since the controller 70 is electrically connected to the nozzle assembly 10, the controller 70 may control a fuel injection cycle of the nozzle assembly 10 by applying an injection control signal to the nozzle assembly 10.

As shown in FIG. 1, an expander 62 is connected to a shaft 63 that rotates while connected to the compressor 61. As exhaust gas discharged from the combustion chamber 40 of the gas turbine is supplied to the expander 62. The compressor 61 and the expander 62 may rotate together. Also, as a load 64 is connected to the expander 62, the load 64 may be driven by using energy of the exhaust gas.

A pressure sensor 51 that senses discharge pressure of compressed air may be positioned on an outlet of the compressor 61. The pressure sensor 51 may sense a change in discharge pressure of the compressor 61. As the controller 70 is electrically connected with the pressure sensor 51, the controller 70 receives a sensing signal sensed by the pressure sensor 51. Thus, the controller 70 may detect a change in altitude based on a change in discharge pressure of the compressor 61.

Figure 2:
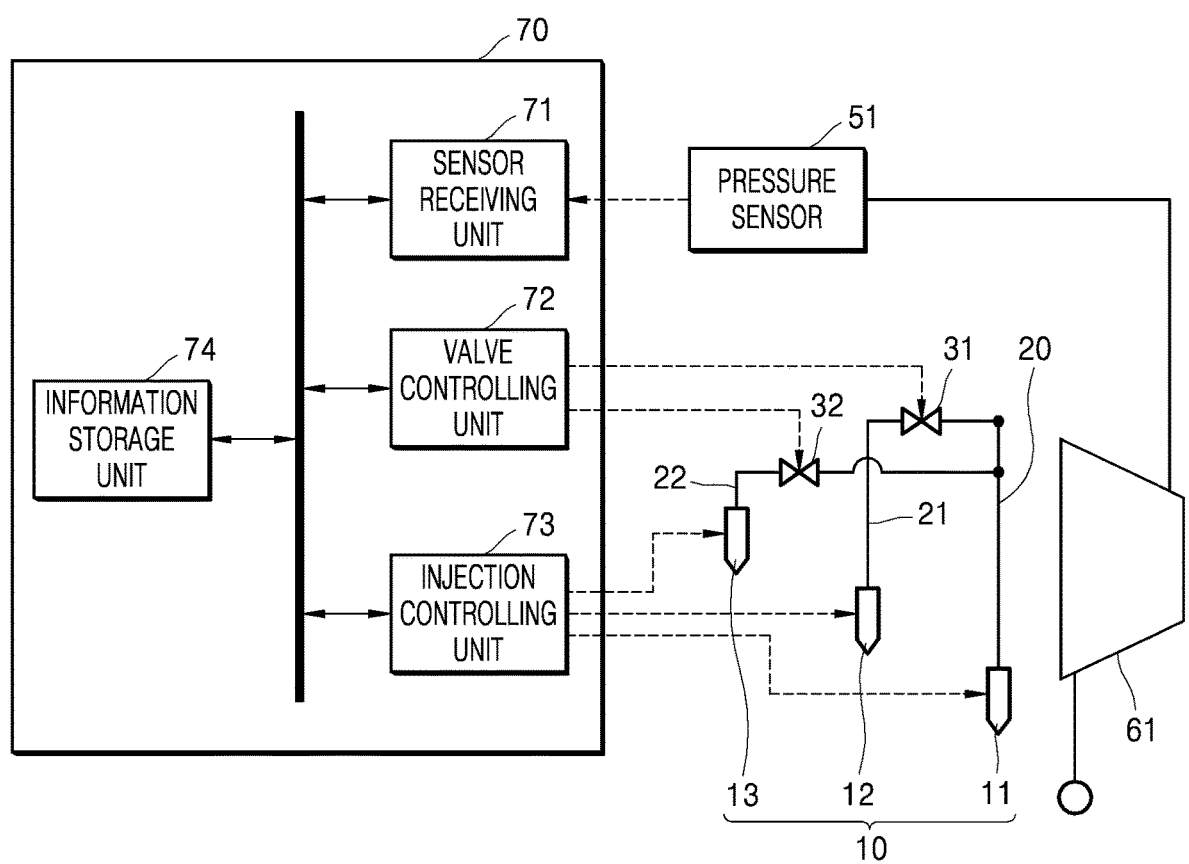
FIG. 2 is a schematic block diagram illustrating connections between a controller and elements of the fuel injection system of FIG. 1.
Figure 3:
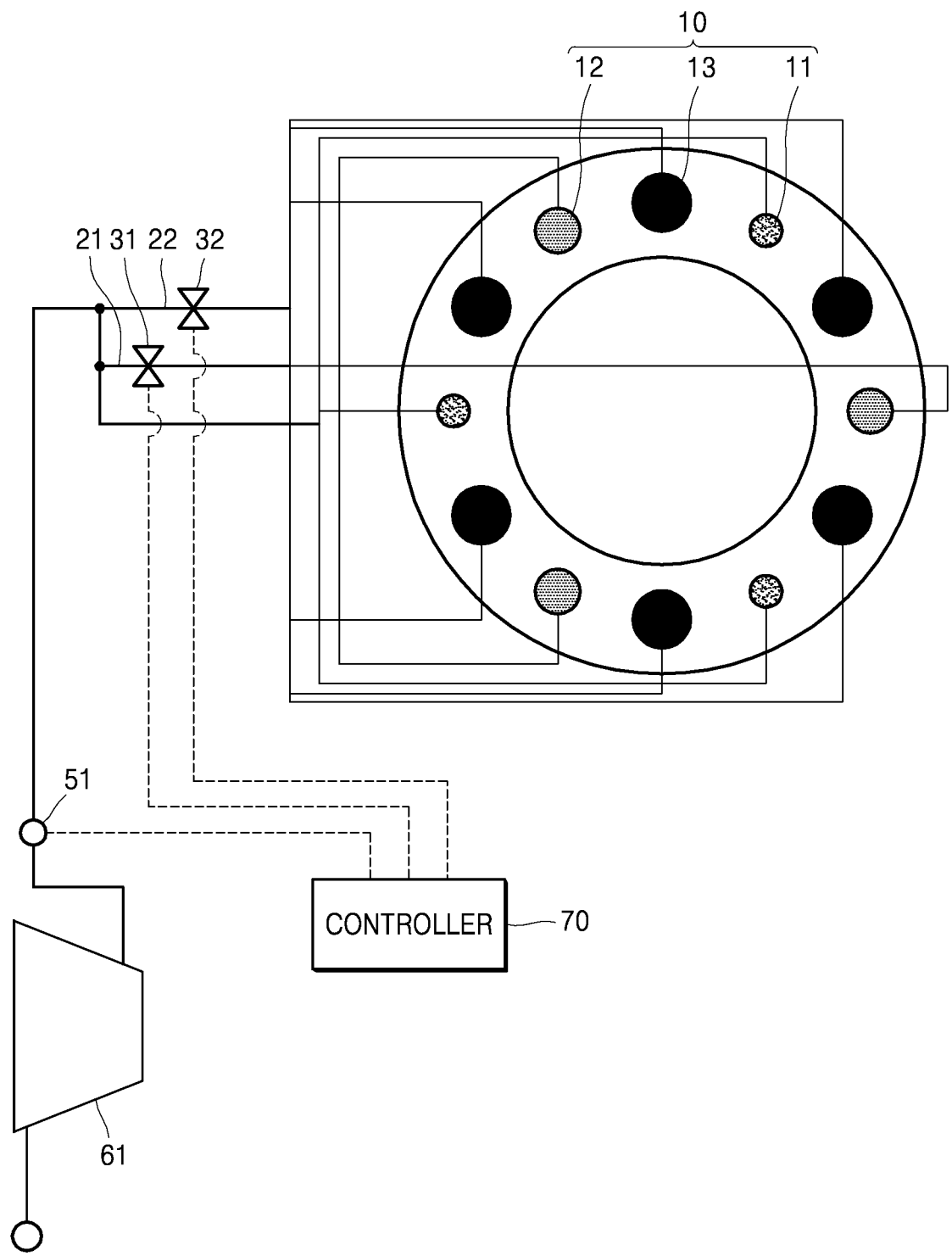
FIG. 3 is a schematic diagram illustrating connections between the controller and the elements of the fuel injection system of FIGS. 1 and 2.

FIG. 2 is a schematic block diagram illustrating connections between the controller 70 and elements of the fuel injection system of FIG. 1, and FIG. 3 is an another schematic diagram illustrating connections between the controller 70 and elements of the fuel injection system of FIG. 1.

Since the controller 70 is electrically connected to the pressure sensor 51, the first and second valves 31 and 32, and the nozzle assembly 10, the controller 70 may control each element such as the first and second valves 31 and 32 and the nozzle assembly 10 and may receive a sensing signal of the pressure sensor 51.

The controller 70 may be embodied in various forms, for example, a semiconductor chip, a control board manufactured in a form of a printed circuit board including a semiconductor chip and circuits, software to be included in a semiconductor chip or a control board, or an algorithm for control included in a computer to be installed in semiconductor chip-mounted equipment.

As shown in FIG. 2, the controller 70 includes a sensor receiving unit 71 which receives a sensing signal of the pressure sensor 51 that senses discharge pressure of the compressor 61, a valve controlling unit 72 which opens or closes the first valve 31 and the second valve 32 by applying actuation signals to the first valve 31 and the second valve 32, an injection controlling unit 73 which controls a fuel injection cycle by applying an injection control signal regarding the fuel injection cycle to the nozzle assembly 10, and an information storage unit 74 which stores information on a change in fuel flow rate of the gas turbine according to a change in altitude, and information on controls for opening or closing the first valve 31 and the second valve 32 according to the change in fuel flow, and the like.

Referring to FIG. 3, the nozzle assembly 10 has a structure in which injection portions of the first pilot nozzle 11, the second pilot nozzle 12, and the main nozzle 13 have different circumferential areas from each other and are alternately spaced apart from each other along a circumferential direction. In an exemplary embodiment shown in FIG. 3, a total of three pairs of the first pilot nozzle 11, the second pilot nozzle 12, and the main nozzle 13 are disposed and the first pilot nozzle 11 and the main nozzle 13 respectively have the smallest area and the largest area. Likewise, a flow of fuel injected by each of the first pilot nozzle 11, the second pilot nozzle 12, and the main nozzle 13 is determined by a corresponding area of each of the first pilot nozzle 11, the second pilot nozzle 12, and the main nozzle 13, respectively.

The application is not limited to an arrangement of the nozzle assembly 10 as illustrated in FIG. 3. The number and disposition structure of the first pilot nozzle 11, the second pilot nozzle 12, and the main nozzle 13 may be modified.

Figure 4:
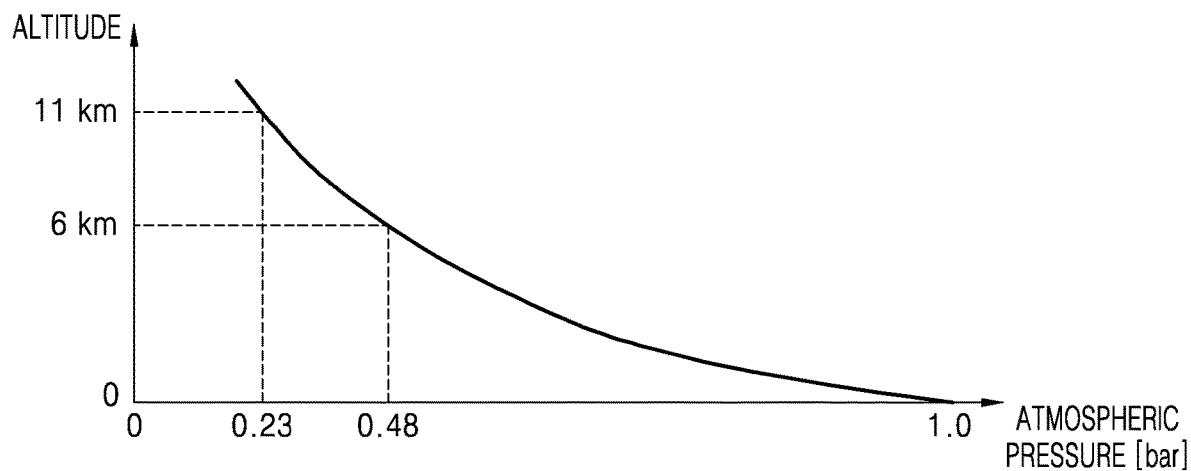
FIG. 4 is a graph illustratively showing a change in atmospheric pressure according to an altitude change of an aircraft.
Figure 5:
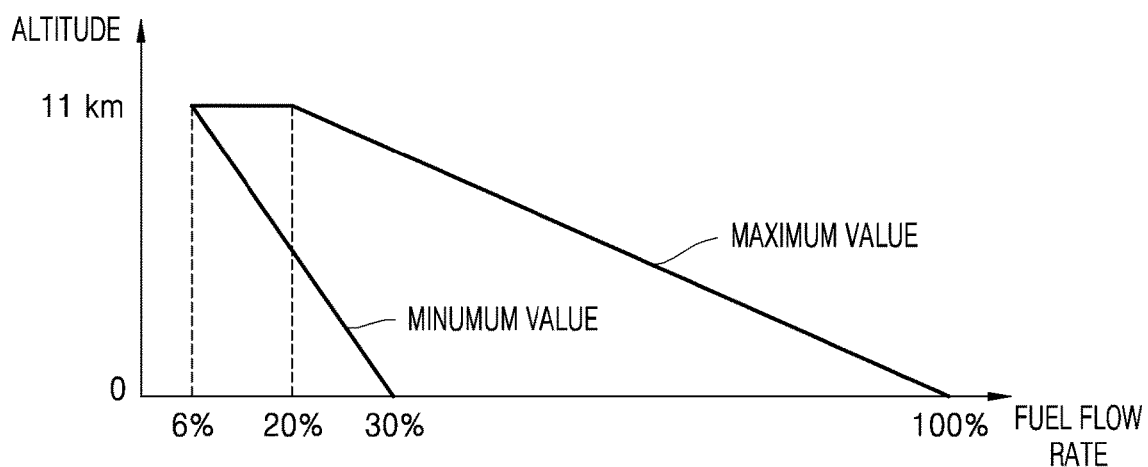
FIG. 5 is a graph illustratively showing that a fuel flow rate of an auxiliary power unit (APU) of the aircraft changes according to the altitude change of FIG. 4.

FIG. 4 is a graph illustratively showing a change in atmospheric pressure according to an altitude change of an aircraft, and FIG. 5 is a graph illustratively showing that a fuel flow rate of an APU of the aircraft changes according to the altitude change of FIG. 4.

Referring to FIG. 4, atmospheric pressure decreases greatly as the altitude of the aircraft changes. That is, while atmospheric pressure on the ground is 1.0 bar, the atmospheric pressure decreases to 0.48 bar when the altitude of the aircraft reaches 6 km and to 0.23 bar when the altitude of the aircraft reaches 11 km.

Referring to FIG. 5 in comparison with FIG. 4, the fuel flow rate of the APU changes greatly as the altitude of the aircraft changes. For example, as a minimum value of the fuel flow rate (i.e. 30%) changes in FIG. 5, such as when the APU is driven under an idle condition, the fuel flow rate decreases up to 6% at an altitude of 11 km. Also, as the fuel flow rate changes for a maximum value of the fuel flow rate (i.e. 100%) as shown in FIG. 5 when the APU is driven in a maximum load condition, the fuel flow rate decreases up to 20% at the altitude of 11 km.

Figure 6:
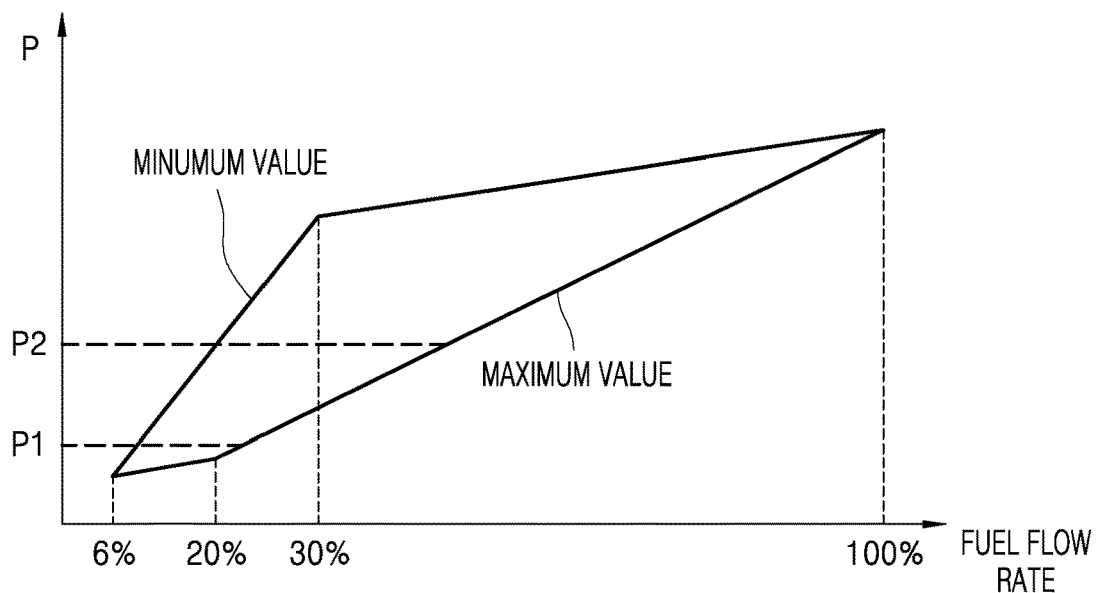
FIG. 6 is a graph illustratively showing a change in a fuel flow rate according to an altitude change of an aircraft APU employing the fuel injection system of FIG. 1.
Figure 7:
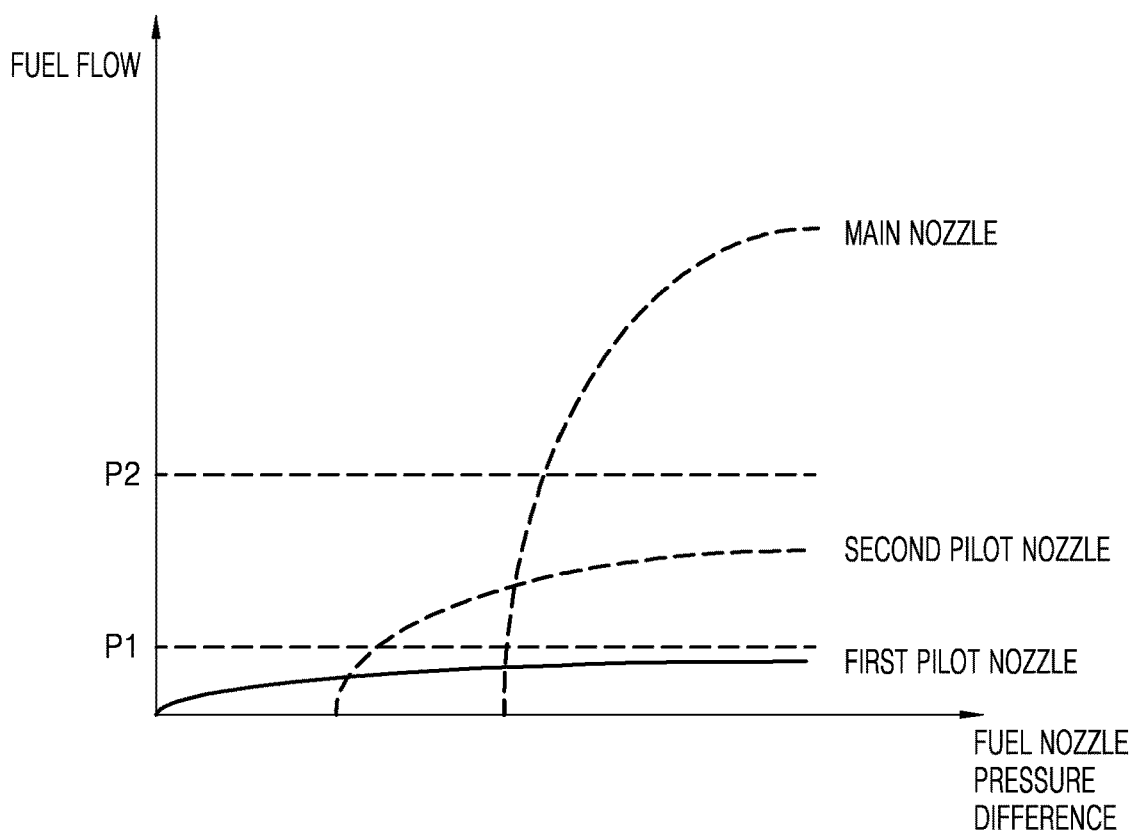
FIG. 7 is a graph illustratively showing a change in fuel flow when only a first pilot nozzle operates in the fuel injection system of FIG. 1.

FIG. 6 is a graph illustratively showing a change in a fuel flow rate according to an altitude change of an aircraft APU employing the fuel injection system of FIG. 1. FIG. 7 is a graph illustratively showing a change in fuel flow when only the first pilot nozzle 11 operates in the fuel injection system of FIG. 1.

The fuel injection system according to the embodiment shown in FIGS. 1 to 3 may encounter an altitude change of an aircraft, and thus, control the first valve 31 and the second valve 32, to thereby control the flow of fuel injected into a gas turbine.

Referring to FIG. 6, since the fuel flow rate of the aircraft APU is improved due to a fuel flow control operation by the fuel injection system when discharge pressure of a compressor changes, a fuel flow rate may be secured to allow the aircraft APU to stably operate.

The operation to control the fuel flow rate will now be described. When discharge pressure P of a compressor is less than first pressure P1, the fuel injection system of FIG. 1 closes both of the first valve 31 and the second valve 32. Accordingly, the second pilot nozzle 12 and the main nozzle 13 may not inject fuel, and only the first pilot nozzle 11, which injects the first flow rate range injects fuel into the combustion chamber 40. The first pilot nozzle 11 has the smallest flow rate range of all the nozzles.

Referring to FIG. 7, when the discharge pressure P of the compressor is less than the first pressure P1 (in a lower area of a dashed line indicated as P1 in FIG. 7), only the first pilot nozzle 11 operates, and thus, fuel in the first fuel flow rate range, the minimum flow range, is supplied to the gas turbine. The case in which the discharge pressure P of the compressor is less than the first pressure P1 corresponds to when the aircraft APU is started or run with minimum power and therefore, supplying fuel just by the first pilot nozzle 11 is enough.

Figure 8:
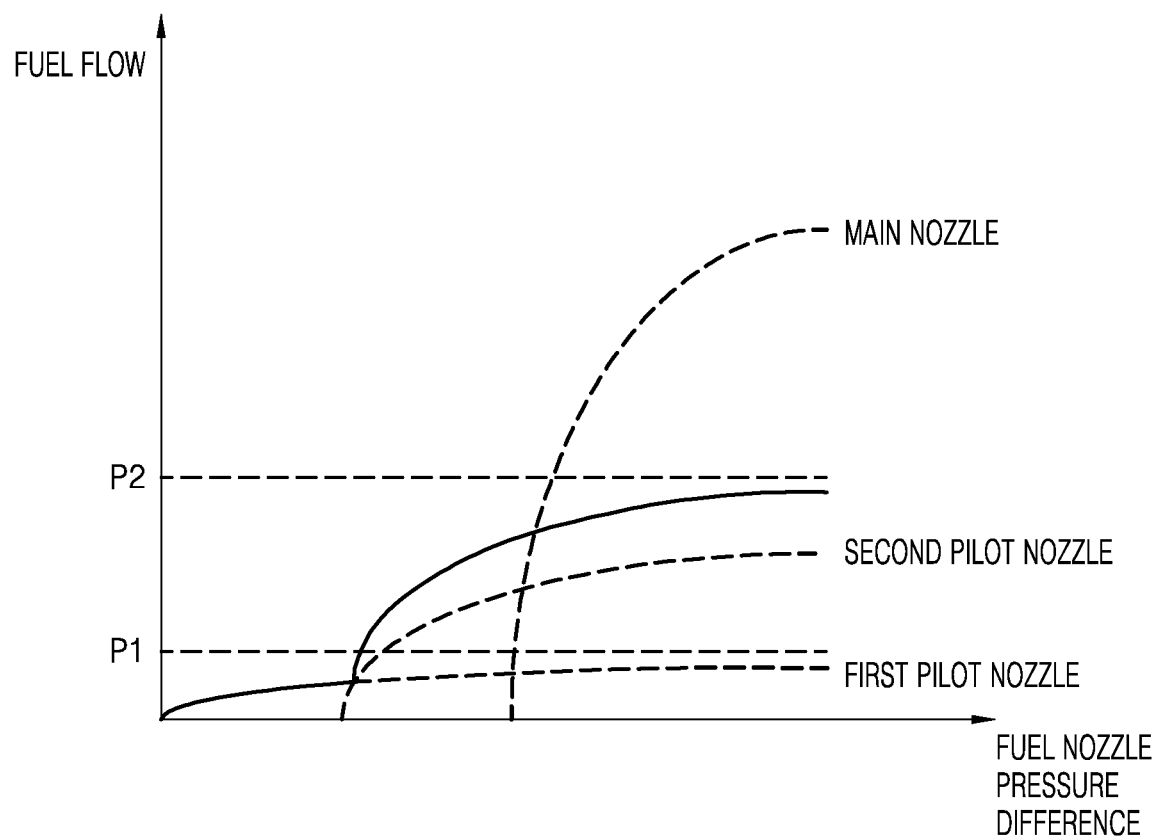
FIG. 8 is a graph illustratively showing a change in fuel flow when a second pilot nozzle operates in the fuel injection system of FIG. 1.

FIG. 8 is a graph illustratively showing a change in fuel flow when the second pilot nozzle 12 operates in the fuel injection system of FIG. 1.

When, in FIG. 6, the discharge pressure P of the compressor is equal to or greater than the first pressure P1 and less than predetermined second pressure P2, the fuel injection system of FIG. 1 opens the first valve 31 and closes the second valve 32. Accordingly, the main nozzle 13 may not inject fuel, and the first pilot nozzle 11 and the second pilot nozzle 12 inject fuel into the combustion chamber 40.

Referring to FIG. 8, when the discharge pressure P of the compressor is equal to or greater than the first pressure P1 and less than the second pressure P2 (in an area between a dashed line indicated as P1 and another dashed line indicated as P2 in FIG. 8), the first pilot nozzle 11 and the second pilot nozzle 12 operate together, and thus, fuel obtained by adding the first range of fuel flow rate and the second range of fuel flow rate is supplied to the gas turbine. The case in which the discharge pressure P of the compressor is equal to or greater than the first pressure P1 and less than the second pressure P2 corresponds to when power of the aircraft APU gradually increases, and therefore, fuel may be supplied to the gas turbine by the second pilot nozzle 12 along with the first pilot nozzle 11.

Figure 9:
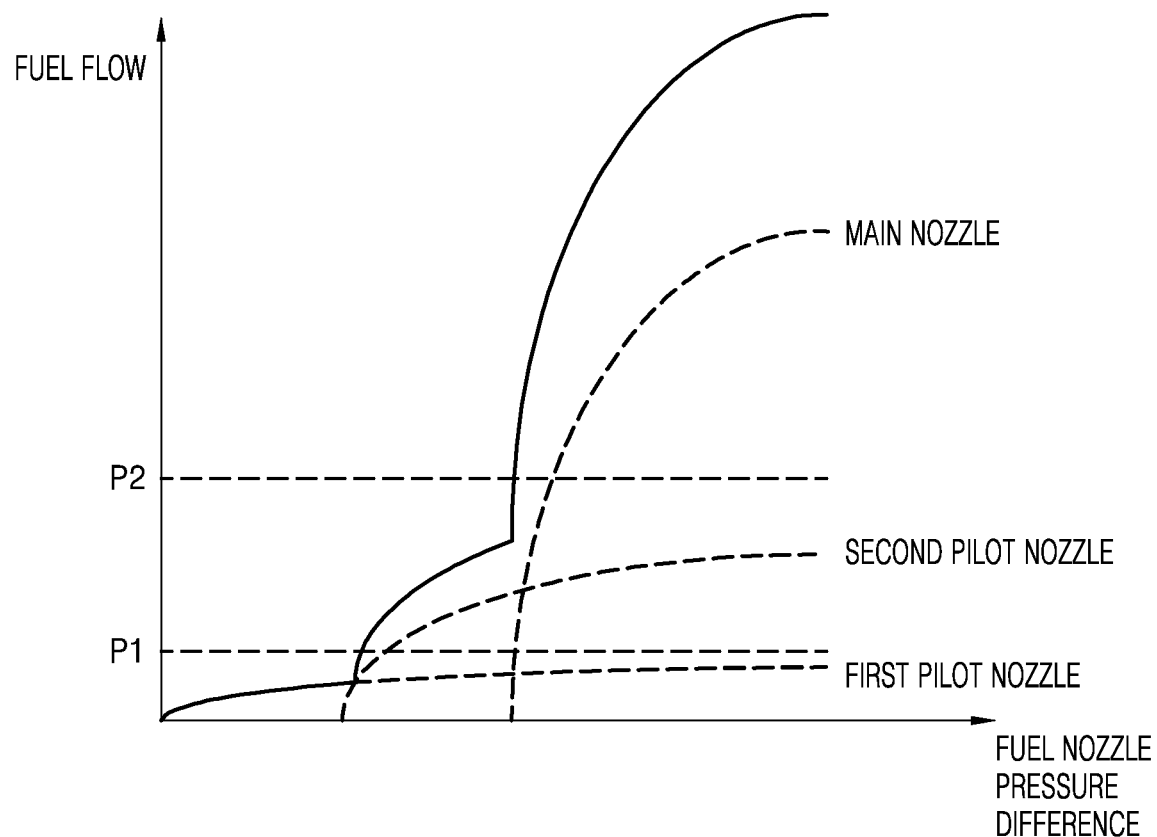
FIG. 9 is a graph for illustratively showing a change in fuel flow when a main nozzle operates in the fuel injection system of FIG. 1.

FIG. 9 is a graph illustratively showing a change in fuel flow when the main nozzle 13 operates in the fuel injection system of FIG. 1.

Referring to FIG. 6, when the discharge pressure P of the compressor is equal to or greater than the second pressure P2, the fuel injection system of FIG. 1 opens both of the first valve 31 and the second valve 32. Accordingly, the first pilot nozzle 11, the second pilot nozzle 12, and the main nozzle 13 all together inject fuel into the combustion chamber 40.

Referring to FIG. 9, when the discharge pressure P of the compressor is equal to or greater than the second pressure P2 (in an upper area of a dashed line indicated as P2 in FIG. 9), the first pilot nozzle 11, the second pilot nozzle 12, and the main nozzle 13 operate together, and thus, fuel obtained by adding the first fuel flow rate range, the second fuel flow rate range, and the third fuel flow rate range is supplied to the gas turbine. The case in which the discharge pressure P of the compressor is equal to or greater than the second pressure P2 corresponds to when power of the aircraft APU rapidly increases, and therefore, fuel may be supplied to the gas turbine by the second pilot nozzle 12 along with the first pilot nozzle 11 and the main nozzle 13.

In a fuel injection system according to an embodiment as described above, operation of a nozzle assembly may be controlled by detecting a change in altitude of an aircraft based on a change in compressor discharge pressure (CDP) sensed by sensing discharge pressure of a compressor. That is, since a fuel injection operation may be controlled with an optimum amount of injected fuel by reflecting the change in altitude of the aircraft, and thus, selectively controlling operations of a first pilot nozzle, a second pilot nozzle, and a main nozzle, an APU of the aircraft may be stably fueled in response to the altitude change of the aircraft.

Figure 10:
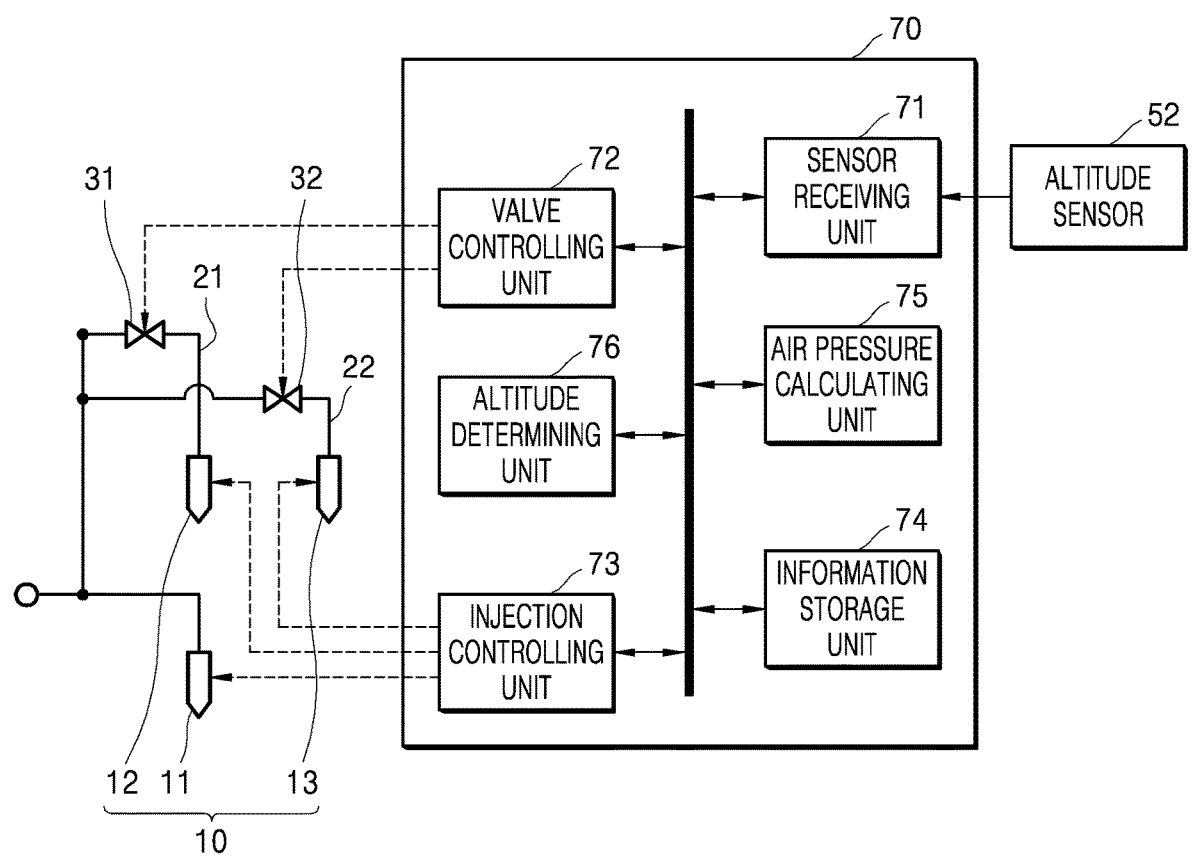
FIG. 10 is a schematic block diagram illustrating connections between elements of a fuel injection system according to an exemplary embodiment.

FIG. 10 is a schematic block diagram for illustrating connections between elements of a fuel injection system according to another exemplary embodiment.

The configuration of the fuel injection system of FIG. 10 is substantially similar to that of the fuel injection system of FIGS. 1 to 3, except that detailed configuration of the controller 70 has been modified and an altitude sensor 52 has been adopted.

In the fuel injection system of FIG. 10, the nozzle assembly 10 includes the first pilot nozzle 11, the second pilot nozzle 12, and the main nozzle 13 injecting fuel at different ranges of flow. The first valve 31 opening or closing the first supply pipe 21 fueling the second pilot nozzle 12 and the second valve 32 opening or closing the second supply pipe 22 fueling the main nozzle 13 are controlled by the controller 70.

The controller 70 includes the valve controlling unit 72, which allows for selecting either the first pilot nozzle 11, the second pilot nozzle 12, or the main nozzle 13, and thus, injecting fuel by applying control signals to the first valve 31 and the second valve 32. This controls the opening and closing of the first supply pipe 21 and the second supply pipe 22. The injection controlling unit 73 controls a fuel injection cycle of the nozzle assembly 10, the sensor receiving unit 71 receives a sensed value from the altitude sensor 52, the information storage unit 74 stores information indicating the current altitude of an aircraft in response to a sensed value received from the altitude sensor 52, an altitude determining unit 76 determines the current altitude of the aircraft based on the sensed value received from the altitude sensor 52, and an air pressure calculates unit 75 calculating air pressure that corresponds to the current altitude of the aircraft.

The altitude sensor 52 may be embodied by various methods, such as sensing altitude by sensing air pressure, using ultrasonic waves, using radar, or using a global position system (GPS).

The information storage unit 74 may store information such as a table or a calculation formula that indicates the current altitude of an aircraft in response to a sensed value of the altitude sensor 52 based on how the altitude sensor 52 is embodied. Also, the information storage unit 74 may store in advance fiducial values for driving the first valve 31 and the second valve 32 in regard to a change in altitude of the aircraft.

If the current altitude sensed by the altitude sensor 52 is in a predetermined first range, the valve controlling unit 72 of the controller 70 may close both of the first valve 31 and the second valve 32, thereby, fueling a gas turbine just by the first pilot nozzle 11.

If the current altitude sensed by the altitude sensor 52 is greater than the first range and less than a predetermined second range, the valve controlling unit 72 of the controller 70 may open the first valve 31 and close the second valve 32, thereby, fueling the gas turbine by using the first pilot nozzle 11 and the second pilot nozzle 12.

If the current altitude sensed by the altitude sensor 52 is in or greater than the second range, the valve controlling unit 72 of the controller 70 may open both of the first valve 31 and the second valve 32, thereby, fueling the gas turbine by using all of the first pilot nozzle 11, the second pilot nozzle 12, and the main nozzle 13.

In a fuel injection system according to an exemplary embodiment described above, operation of a nozzle assembly may be controlled by sensing a current altitude at which an aircraft flies and detecting a change in altitude of the aircraft. That is, since a fuel injection operation may be controlled with an optimum amount of injected fuel by selectively controlling operations of a first pilot nozzle, a second pilot nozzle, and a main nozzle depending on a range of altitude, an APU of the aircraft may be stably fueled in response to the altitude change of the aircraft.

In a fuel injection system according to an embodiment as described above, the controller may retain information on a current altitude corresponding to a sensed value of the altitude sensor, and closes both of the first valve and the second valve when the current altitude is in a predetermined first range, opens the first valve and closes the second valve when the current altitude is greater than the first range and less than a predetermined second range and opens both of the first valve and the second valve when the current altitude is in or greater than the second range.

Figure 11:
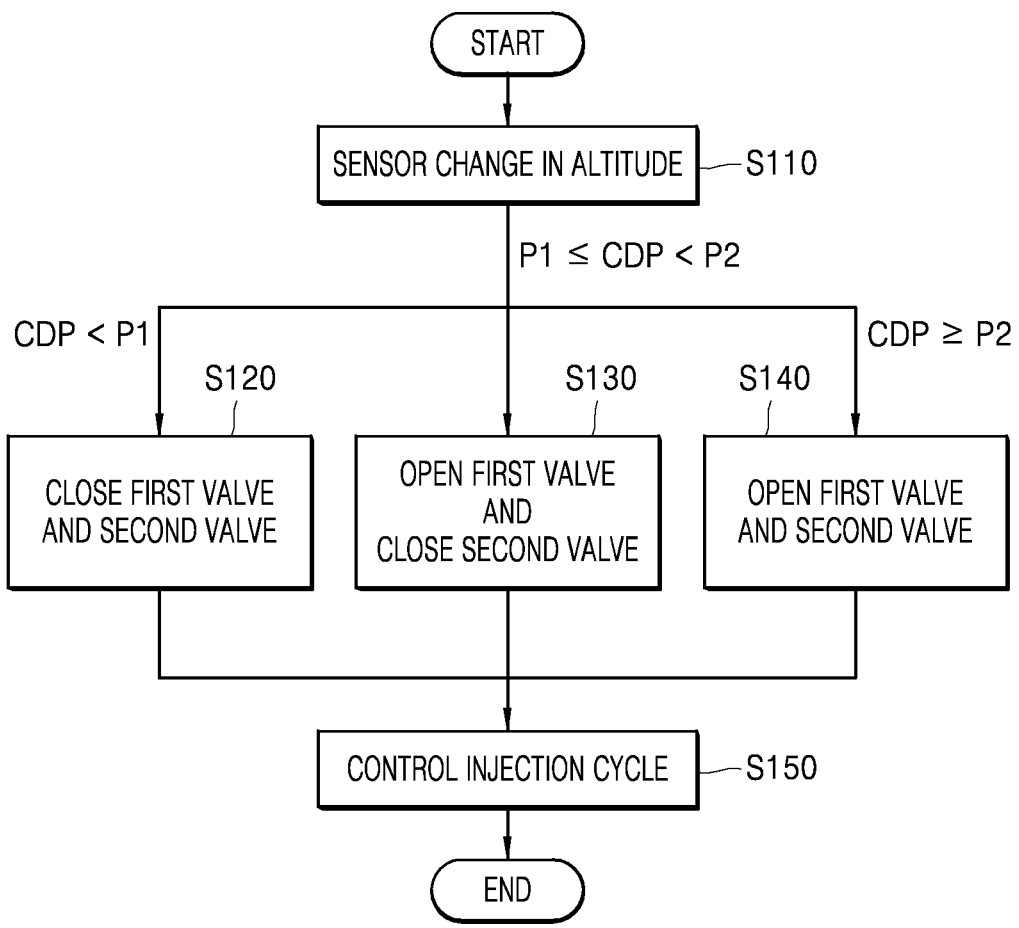
FIG. 11 is a flowchart illustrating operations of a method of controlling the fuel injection system of FIGS. 1 to 10.

FIG. 11 is a flowchart for illustrating operations of a method of controlling the fuel injection system of FIGS. 1 to 10.

A method of controlling a fuel injection system according to an exemplary embodiment shown in FIG. 11 includes sensing a change in altitude (operation S110) and injecting fuel into a gas turbine by selecting at least one of a first pilot nozzle, a second pilot nozzle, and a main nozzle injecting fuel in different ranges of flow rate (operations S120, S130, S140, and S150).

In operation S110 of sensing a change in altitude, an altitude sensor which directly senses altitude may be used or a pressure sensor may be used which senses a change in altitude by sensing a change in discharge pressure of a compressor supplying compressed air into the gas turbine.

In an operation of injecting fuel, in the case that a sensed CDP is less than a predetermined first pressure P1, a first valve, which opens or closes a first supply pipe supplying fuel to the second pilot nozzle, and a second valve, which opens or closes a second supply pipe supplying fuel to the main nozzle, are all closed (operation S120), and an injection cycle is controlled (operation S150). Thus, the gas turbine may be fueled just by using the first pilot nozzle injecting fuel in the smallest flow rate range.

In the case that the sensed CDP is equal to or greater than the first pressure P1 and less than a predetermined second pressure P2, the first valve is opened and the second valve is closed (operation S130), and the injection cycle is controlled (operation S150). Thus, the gas turbine may be fueled by using the first pilot nozzle and the second pilot nozzle together.

In the case that the sensed CDP is equal to or greater than the second pressure P2, the first valve and the second valve are both opened (operation S140), and the injection cycle is controlled (operation S150). Thus, maximum fuel flow rate may be supplied to the gas turbine by using all of the first pilot nozzle, the second pilot nozzle, and the main nozzle.

According to a method of controlling a fuel injection system according to an embodiment described above, since a fuel injection operation may be controlled with an optimum amount of injected fuel by reflecting a change in altitude of an aircraft, and thus, selectively controlling operations of a first pilot nozzle, a second pilot nozzle, and a main nozzle, an APU of the aircraft may be stably fueled in response to the altitude change of the aircraft.

In a fuel injection system and a method of controlling the same according to the above exemplary embodiments, descriptions have been made of only an example of using two pilot nozzles such as the first pilot nozzle 11 and the second pilot nozzle 12. However, the present embodiments are not limited to this number of pilot nozzles. Accordingly, fuel may be injected in a flow rate range that is smaller than a main flow rate, and a suitable amount of fuel injection may also be subdivided and adjusted in an APU of an aircraft by placing a plurality of pilot nozzles injecting fuel in different ranges of flow rate, placing valves on supply pipes respectively fueling the pilot nozzles, controlling each of the valves, and selecting some of the pilot nozzles, and thus, controlling fuel injection.

As described above, according to one or more of the above exemplary embodiments, since a fuel injection operation may be controlled with an optimum amount of fuel injection by selectively controlling operations of a first pilot nozzle, a second pilot nozzle, and a main nozzle as altitude changes, an APU of an aircraft may be stably fueled in response to an altitude change of the aircraft.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A fuel injection system of a gas turbine comprising:
a first pilot nozzle injecting fuel at a first flow rate into the gas turbine;
a second pilot nozzle injecting the fuel at a second flow rate that is greater than the first flow rate into the gas turbine;
a main nozzle injecting the fuel at a third flow rate that is greater than the second flow rate into the gas turbine;
a first valve disposed on a first supply pipe supplying the fuel to the second pilot nozzle and opening or closing the first supply pipe in response to a first signal;
a second valve disposed on a second supply pipe supplying the fuel to the main nozzle and opening or closing the second supply pipe in response to a second signal;
a third supply pipe supplying the fuel to the first pilot nozzle, the third supply pipe extending from the first pilot nozzle to a fuel pump without a valve;
a combustion chamber fueled by the first pilot nozzle, the second pilot nozzle, and the main nozzle;
a compressor supplying compressed air to the combustion chamber;
a pressure sensor sensing a discharge pressure of the compressor; and
a controller selectively opening or closing any one of the first supply pipe and the second supply pipe, or opening or closing both of the first supply pipe and the second supply pipe, by detecting a change in altitude,
wherein the controller is electrically connected to the pressure sensor and detects the change in altitude based on an electric signal from the pressure sensor corresponding to a sensed change in the discharge pressure of the compressor, and
wherein as a result of detecting the change in altitude, the controller sends signals to the first valve and the second valve to open or close the first supply pipe or the second supply pipe to, to control a flow of the fuel to be injected into the gas turbine,
wherein a center point of the first pilot nozzle, a center point of the second pilot nozzle and a center point of the main nozzle are positioned on a circumference in a circular pattern.

2. The system of claim 1, wherein the controller closes both of the first valve and the second valve when the discharge pressure of the compressor is less than a predetermined first pressure, opens the first valve and closes the second valve when the discharge pressure of the compressor is equal to or greater than the first pressure and less than a predetermined second pressure, and opens both of the first valve and the second valve when the discharge pressure of the compressor is equal to or greater than the second pressure.

3. The system of claim 1 further comprising an altitude sensor sensing altitude by sensing air pressure, using ultrasonic waves, using radar, or using a global position system (GPS), wherein the controller is connected to the altitude sensor and senses the change in altitude.

4. The system of claim 3, wherein the controller retains information on a current altitude corresponding to a sensed value of the altitude sensor, and closes both of the first valve and the second valve when the current altitude is in a predetermined first range, opens the first valve and closes the second valve when the current altitude is greater than the first range and less than a predetermined second range and opens both of the first valve and the second valve when the current altitude is in or greater than the second range.

5. The system of claim 1, wherein flows of the fuel injected by the first pilot nozzle, the second pilot nozzle, and the main nozzle are determined by areas of the first pilot nozzle, the second pilot nozzle, and the main nozzle.

6. The system of claim 1, wherein the first pilot nozzle, the second pilot nozzle and the main nozzle are alternately spaced apart from each other along the circumference.

7. A fuel injection system for a gas turbine, the system comprising:
- a nozzle assembly comprising a plurality of pilot nozzles injecting fuel in different flow rates into the gas turbine and a main nozzle injecting the fuel in a flow rate that is larger than the flow rates of the plurality of pilot nozzles into the gas turbine;
- a plurality of pilot supply pipes supplying the fuel to the plurality of pilot nozzles, a first pilot supply pipe of the plurality of pilot supply pipes extends between a fuel pump and a first pilot nozzle of the plurality of pilot nozzles;
- a main supply pipe supplying the fuel to the main nozzle;
- a plurality of valves respectively disposed on the main supply pipe and all of the plurality of pilot supply pipes except the first supply pipe,
- wherein the first pilot nozzle injects the fuel into the gas turbine in a smallest flow rate among the plurality of pilot nozzles, and the plurality of valves respectively open or close the plurality of supply pipes in response to signals;
- a combustion chamber fueled by the plurality of pilot nozzles and the main nozzle;
- a compressor supplying compressed air to the combustion chamber;
- a pressure sensor sensing a discharge pressure of the compressor; and
- a controller selectively opening at least one supply pipe selected from the plurality of supply pipes or closing all of the plurality of supply pipes, as a result of detecting a change in altitude and sending the signals to the valves,
- wherein the controller is electrically connected to the pressure sensor and detects the change in altitude based on an electric signal from the pressure sensor corresponding to a sensed change in the discharge pressure of the compressor, and
- wherein the controller controls a flow of the fuel to be injected into the gas turbine,
- wherein the first pilot nozzle injects the fuel at a first flow rate into the gas turbine, a second pilot nozzle of the plurality of pilot nozzles injects the fuel at a second flow rate that is greater than the first flow rate into the gas turbine, and
- wherein a center point of the first pilot nozzle, a center point of the second pilot nozzle and a center point of the main nozzle are positioned on a circumference in a circular pattern.

8. The system of claim 7, wherein the controller closes all of the valves when the discharge pressure of the compressor is less than a predetermined first pressure and selects and opens at least some of the valves depending on a size of the discharge pressure of the compressor when the discharge pressure of the compressor is equal to or greater than the first pressure.

9. The system of claim 7 further comprising an altitude sensor sensing altitude by sensing air pressure, using ultrasonic waves, using radar, or using a global position system (GPS), wherein the controller is connected to the altitude sensor and senses the change in altitude.

10. The system of claim 9, wherein the controller retains information on a current altitude corresponding to a sensed value of the altitude sensor, and closes all of the valves when the current altitude is in a predetermined first range, selects and opens some of the valves when the current altitude is greater than the first range and less than a predetermined second range and opens all of the valves when the current altitude is in or greater than the second range.

11. A method of controlling a fuel injection system for a gas turbine, the method comprising:
- injecting, to a first pilot nozzle, fuel at a first flow rate into the gas turbine;
- injecting, to a second pilot nozzle, the fuel at a second flow rate that is greater than the first flow rate into the gas turbine;
- injecting, to a main nozzle, the fuel at a third flow rate that is greater than the second flow rate into the gas turbine;
- opening or closing a first valve disposed on a first supply pipe supplying the fuel to the second pilot nozzle, in response to a first signal;
- opening or closing a second valve disposed on a second supply pipe supplying the fuel to the main nozzle, in response to a second signal;
- supplying the fuel to the first pilot nozzle by a third supply pipe, the third supply pipe extending from the first pilot nozzle to a fuel pump without a valve;
- fueling a combustion chamber by the first pilot nozzle, the second pilot nozzle, and the main nozzle;
- supplying, by a compressor, compressed air to the combustion chamber;
- sensing a change in altitude by sensing a discharge pressure of the compressor;
- selectively opening or closing, by a controller, any one of the first supply pipe and the second supply pipe, or opening or closing both of the first supply pipe and the second supply pipe by the sensed change in altitude based on an electrical signal from a pressure sensor corresponding to a sensed change in the discharge pressure of the compressor; and
- sending, by the controller, signals to the first valve and the second valve to open or close the first supply pipe or the second supply pipe to, to control a flow of the fuel to be injected into the gas turbine,
- wherein a center of the first pilot nozzle, a center of the second pilot nozzle and a center of the main nozzle are positioned on a circumference in a circular pattern.

12. The method of claim 11,
wherein the injecting of the fuel comprises closing both of the first valve and the second valve when the discharge pressure of the compressor is less than a predetermined first pressure, opening the first valve and closing the second valve when the discharge pressure of the compressor is equal to or greater than the first pressure and less than a predetermined second pressure, and opening both of the first valve and the second valve when the discharge pressure of the compressor is equal to or greater than the second pressure.

* * * * *